May 2, 1967 R. J. WRIGHTON ET AL 3,316,775
CONTROL LINE REGULATOR
Filed June 1, 1965 2 Sheets-Sheet 1

INVENTORS
ROBERT J. WRIGHTON
JAMES E. GLAUSER
BY Paul B. Hunter
ATTORNEY

May 2, 1967
R. J. WRIGHTON ET AL
3,316,775
CONTROL LINE REGULATOR
Filed June 1, 1965
2 Sheets-Sheet 2
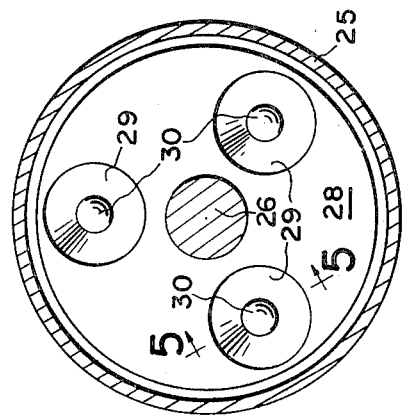
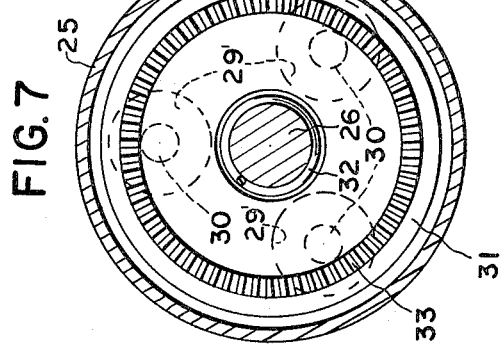
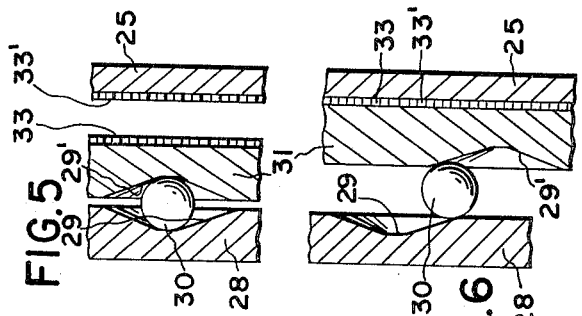
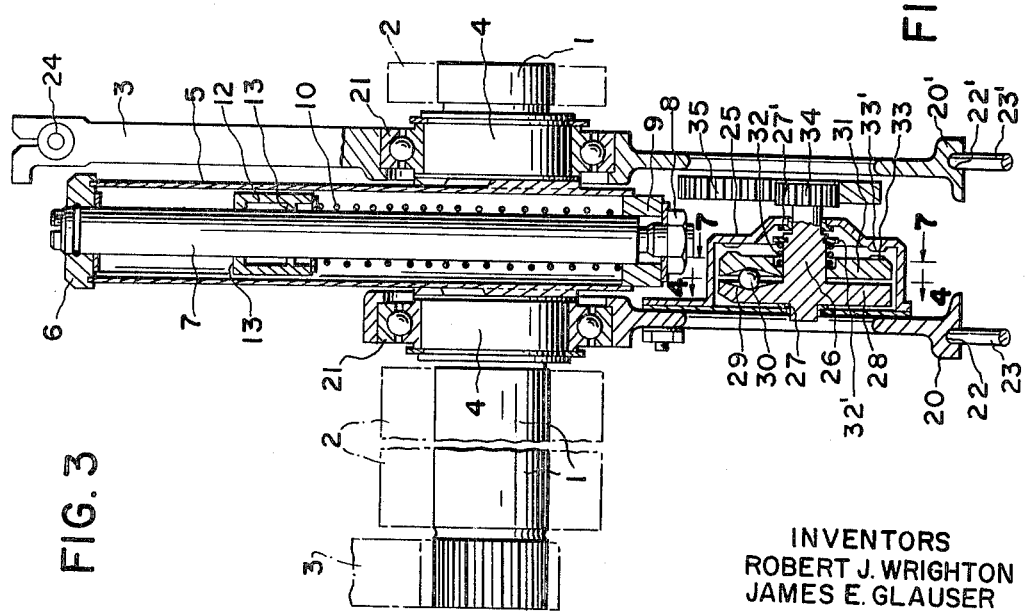
INVENTORS
ROBERT J. WRIGHTON
JAMES E. GLAUSER
BY *Paul B. Hunter*
ATTORNEY United States Patent Office 3,316,775
Patented May 2, 1967

3,316,775
CONTROL LINE REGULATOR
Robert J. Wrighton and James E. Glauser, both of Santa Ana, Calif., assignors to Pacific Scientific Company, San Francisco, Calif., a corporation of California
Filed June 1, 1965, Ser. No. 460,286
5 Claims. (Cl. 74—501.5)

This invention relates generally to a control line apparatus, and the invention has reference more particularly to a novel control line or tension regulator utilized for maintaining uniform tension in control lines extending between controlling and controlled points, as where operating a controlled member, such as a rudder, elevator, engine throttle or aileron of an airplane, from the control stick, steering wheel, throttle lever or foot pedals, the said regulator acting automatically to compensate for variations in the length of the control lines resulting from such conditions as temperature changes, airplane deflection and distortion, etc., the said regulator acting automatically to lock upon the application of a controlled movement thereto so as to prevent any mushiness in the controls during such controlled operation thereof.

Control line regulators as heretofore constructed generally consist of a pair of compression or regulator springs which are connected through quadrants to exert tension on the control lines or cables equal to the desired rig load of the cable system, together with an automatically locking mechanism which, although it allows a regulator spring force to be exerted on the cables so long as the cables are under neutral or balanced forces, i.e., when the tensions on the control cables are substantially equal, thereby to maintain the desired rig loading, nevertheless, it locks up immediately upon a control force being applied to one of the controlled cables. These control regulators as heretofore generally constructed have not been entirely satisfactory because in case a cable breaks, the controlled surface pulls hard over, or, in case there is a valve inserted between the controlled surface and the regulator, the valve is pulled hard over, resulting in movement of the controlled surface to a dangerous extent which cannot be corrected manually and may result in a fatal accident. In copending application Ser. No. 338,-762, now Patent No. 3,277,738, wherein one of the inventors herein, namely James E. Glauser, is a joint inventor, there is disclosed a novel control line regulator incorporating means for locking the regulator against movement in the event a cable breaks. However, the mechanism used for accomplishing this result in the said application is somewhat complicated and expensive and not entirely fail-safe owing to the use of ratchet teeth, whereas the means for locking the regulator in the event a cable breaks in the present application is of simple, rugged construction and reliable in operation.

It is, therefore, the principal object of the present invention to overcome and correct the above-recited defects of the prior art regulators and to provide a novel construction of regulator that is fast acting, rugged and dependable in operation and which maintains the control lines taut at all times, the said regulator serving in case the cable breaks to prevent the control from moving hard over so that the craft can be maneuvered and handled safely.

One feature of the present invention is to provide a novel control line regulator of the above character and incorporate a surge lock employing inertia balls which act instantaneously to prevent the regulator from compensating large amounts in the event of failure of one side of the cable system, thereby enabling the pilot to operate the aircraft safely in such emergencies.

Another feature of the present invention is to provide a novel regulator of the above character employing a surge lock of compact construction wherein the operating parts are substantially completely enclosed to insure instant action and prevent improper operation, the said surge lock being of simple construction employing inertia ball members which, due to their inertia, serve to effect the locking of the regulator instantly in the event of the breaking of a cable.

These and other features and advantages of the present invention will become more apparent after a perusal of the following specification taken in connection with the accompanying drawings wherein:

FIG. 3 is a sectional view taken along the line 3—3 of FIG. 1;

FIG. 4 is an enlarged sectional view taken along line 4—4 of FIG. 3;

FIG. 5 is an enlarged fragmentary view taken along line 5—5 of FIG. 4;

FIG. 6 is a view similar to FIG. 5 which shows the positions of the parts upon the locking of the regulator by the surge lock; and FIG. 7 is an enlarged sectional view taken along the line 7—7 of FIG. 3.

Similar characters of reference are used in the above figures to designate corresponding parts.

Figure 2:
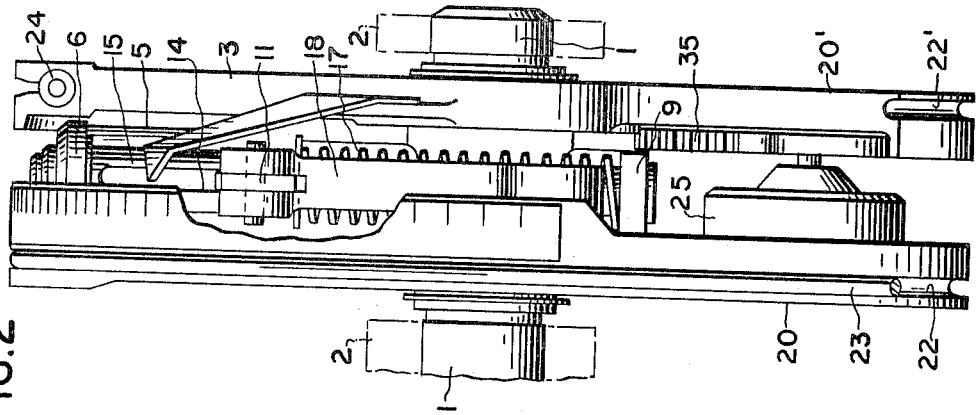
FIG. 2 is a view in side elevation of the structure shown in FIG. 1 with parts broken away.
Figure 1:
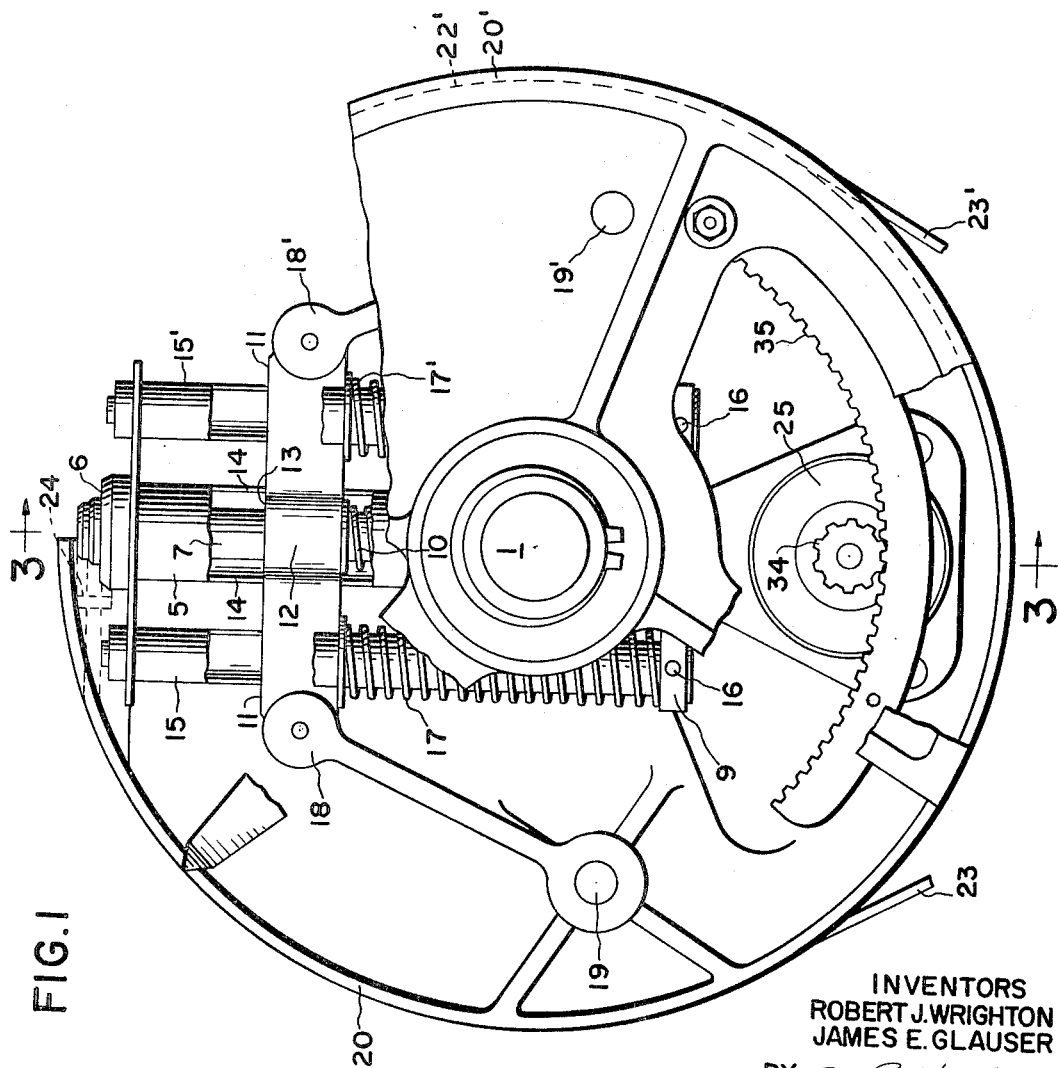
FIG. 1 is a side view with parts broken away showing the novel regulator of the present invention in use.

Referring now to the drawings, the reference numeral 1 designates a regulator shaft that is turnably supported in a suitable bracket or other support 2 mounted on the air frame in a position convenient to the controlled surface. For example, a U-shaped bracket such as is disclosed in Patent No. 2,841,030, of R. J. Wrighton, could be used for this purpose. The shaft 1 has a driving arm 3 splined thereon for driving the controlled member or surface or control valve therefor. The shaft 1 is formed with an enlarged hub portion 4 having a transverse opening through which extends and is secured a tubular support or body 5, which body has a cylindrical fitting 6 at its outer end supporting the outer end of a cylindrical lock shaft 7 contained within body 5, the other end of this shaft being secured as by nut 8 threaded upon a reduced extension thereof and engaging a transversely extending spring support bar 9 that abuts and has a boss projecting into the inner end of the tubular body 5.

A centrally positioned compensating compression spring 10 is contained within the body 5 in surrounding relation to the lock shaft 7 and is compressed between the spring support bar 9 and a transversely extending locking crosshead 11 having a central enlarged hub portion 12 surrounding and slidable along the lock shaft 7 and engaged by spring 10. The hub portion 12 is shown formed with inwardly projecting mutually-spaced shoe portions 13 engaging and loosely slidable upon lock shaft 7. The crosshead 11 extends outwardly in opposite directions from its hub 12 through longitudinal slots 14 in the body 5 and also extends through similar longitudinal slots in outer spring guide tubes 15 and 15' located on opposite sides of body 5 and extending parallel thereto. Tubes 15 and 15' extend at their inner end portions through apertures in the transverse spring support bar 9 and are connected to this bar as by pins 16. Outer compensating compression springs 17 and 17' surround the outer guide tubes 15 and 15' and bear at their inner ends against the support bar 9 and at their outer ends against the locking crosshead 11. Similar links 18 and 18' are pivotally connected at corresponding ends to the respective end portions of locking crosshead 11 and are also pivotally connected at their other ends as by studs 19 and 19' to regulator sectors 20 and 20' that are turnably supported as by anti-friction bearings 21 upon the hub portion 4 of shaft 1. These sectors are oppositely disposed on the shaft hub 4 and are grooved at 22 and 22' to respectively receive control lines 23 and 23' which are anchored at their free ends in ball sockets 24 provided on the sectors 20 and 20' and extend partially around these sectors and continue from thereon to the control member such as a rudder, elevator, aileron, engine throttle.

The regulator sector 20 has a hollow cylindrical surge lock body 25 attached thereto within which is contained a rotor 28, said rotor comprising a central hub portion 26 turnably mounted within spaced bearings 27 and 27' provided in the walls of the surge lock body, the said rotor comprising a circular flanged portion projecting radially outward from hub 26 and provided with substantially conical depressions 29 for receiving the relatively heavy inertia balls 30 as of steel. A thrust ring or member 31, preferably of light metal, is slidably and turnably mounted upon the hub portion 26 and is provided with conical depressions 29' opposite depressions 29 for conformably receiving the inertia balls 30 as especially shown in FIGS. 3 and 5. A light compression spring 32 surrounds the hub portion 26 and is confined between the thrust ring 31 and a washer 32' fixed on the hub portion 26, which spring urges the thrust ring 31 toward the flanged portion 28 of rotor 26, thereby serving to normally retain inertia balls 30 centrally within the deepest portions of conical depressions 29 and 29'. The outer surface of thrust ring 31 is preferably serrated as shown at 33 and the inner surface of the surge lock body 25 is similarly provided with opposing serrations 33', these serrations normally being spaced apart as shown in FIGS. 3 and 5. The hub portion 26 has a reduced extension extending outwardly of the surge lock body 25 and carries a pinion 34 fixed thereon, which pinion meshes with a gear segment 35 fixed upon opposite sector 20'.

In use, the central compensating main rig load spring 10 acts to supply a substantial portion of the desired rig load upon the sectors 20 and 20' by acting through locking crosshead 11, which in turn pulls upon links 18 and 18' connected to the sectors that in turn apply tension to the cables 23 and 23'. The outer compensating or rig load spring 17 and 17' assist the inner central spring 10 in applying the desired rig load. In addition, these compensating springs serve to aid in locking the regulator during a control operation as will further appear. Thus, during the normal compensating action of the regulator, should the cables 23 and 23' contract or expand in unity due to temperature changes, airplane deflection, etc., the springs 10, 17 and 17' will expand and contract to permit such compensating action. Spring 10, being centrally positioned with respect to crosshead 11, aids in preventing accidental locking of the regulator during normal compensating action. During compensating movement of the regulator, the sectors 20 and 20' turn in opposite directions with respect to one another, causing movement of pinion 34 along rack 35, which in turn causes rotor 28 to rotate within the surge lock body 25. During these relatively slow movements of the sectors, the spring 32 serves to hold thrust ring 31 firmly against the inertia balls 30, retaining these balls in the low points of conical depressions 29 and 29' so that the surge lock has no action upon the sectors during the normal compensating movements of the regulator.

Should a control movement be applied to the cables, causing the tension on one cable to be increased while the tension on the other is slackened, a greater force will be applied to one of the springs 17 or 17', depending upon which cable 23 or 23' is pulled upon during the control movement. When this happens, the locking crosshead 11 turns slightly upon lock shaft 7 causing the two portions 13 of the enlarged hub portion 12 of the crosshead 11 to instantly bind upon the lock shaft 7, thereby preventing further deflection of the springs 10, 17 and 17' so that the regulator is locked and acts as an ordinary sheave so there is no mushiness in operating the controlled surface, throttle or control valve, as the case may be. When the control force is removed, the springs 17 and 17' and spring 10 serve to realign the crosshead 11 so that its braking or gripping action on lock shaft 7 is released while positioning crosshead 11 in a truly transverse position so that the same is again free to slide along the lock shaft 7.

In case a cable should break, such action would release the full energy of the regulator springs 10, 17 and 17' tending to rapidly collapse the regulator. This causes excessive angular acceleration between the two sectors 20 and 20'. The surge lock 25 will now serve to instantly lock the two sectors against collapse of the regulator since the relative acceleration of the sheave sectors 20 and 20' exceeds that for which the surge lock is set to operate. For example, assume that the cable 23' affixed to regulator 20' should break. This would result in the immediate and rapid turning of gear segment 35, which in turn would drive pinion 34 to rotate the surge lock rotor 28 at a high rate of acceleration. In such case the relatively heavy inertia balls 30 will tend to lag behind the movement of rotor 28 and will tend to ride out of depressions 29 and 29' into the position shown in FIG. 6, in which position the thrust ring 31 is forced outwardly toward the outer wall of body 25 causing serrations 33 to lock against serrations 33' as shown in FIG. 6, thereby immediately stopping the relative turning of the two sectors and effectively converting the regulator to a rigid member.

In the event the surge lock was not present if a cable should break, the compensating springs of the regulator would shorten the effective length of the unbroken cable thereby causing control surface or throttle movement, as the case may be. If the regulator has a considerable amount of compensation built into it, this can become a hard over signal to a control surface or a wide open or shut-off engine. Should such a condition happen during critical conditions of flight, such as take-offs or landings, it would be catastrophic. It could even be a catastrophic accident if such happened in normal level flight at altitude, for it could put an airplane into an extremely violent maneuver which would exceed the stress factor of the airplane and cause major structural failure thereof. It should be recognized that there may be several hundred pounds of energy stored in the regulator compensation springs 10, 17 and 17', which upon failure of a cable is instantly released. It therefore becomes mandatory that a locking device such as the surge lock herein disclosed performs its function satisfactorily and must be able to operate instantaneously. From actual measurement with the present regulator locking takes place within the order of one-thousandth of a second. The novel locking device of the present regulator functions so perfectly and locks so fast and positively as to prevent any noticeable shock or jolt in the regulator when a cable is cut, and in effect the quadrants move through less than an eighth of an inch after the breaking of a cable in becoming fully locked.

The device of the present invention is a definite improvement over the more complicated equipment disclosed in previously mentioned copending application Ser. No. 338,762. In practice the device in the previous application took a quarter to a half inch of sector movement to lock and even then it was not fully reliable. While the previous device would operate reliably 95% of the time, it occasionally would miss and this was found to be due to the result of a pawl tooth impinging on the edge of a tooth of a ratchet shaft and bouncing therefrom. By the time the pawl could recover and again engage the ratchet, it would be too late and the regulator would bottom out. The new surge locking device of the present invention, once triggered, provides a driving force which cannot recoil or rebound, but can only go forward to cause the jamming condition required to immediately stop the regulator. In thousands of operations of the present regulator where a cable has been deliberately broken, there has been no failure or malfunction of the locking device. In addition, the surge locking device of this invention is relatively inexpensive to manufacture and is compact and easily incorporated in the regulator structure.

Since many changes could be made in the above construction of the novel regulator of this invention and many apparently widely different embodiments of this invention could be made without departing from the scope thereof, it is intended that all matter contained in the above description or shown in the accompanying drawings shall be interpreted as illustrative and not in a limiting sense. If desired, in some instances, the serrations 33 and 33' can be omitted and simple frictional surfaces substituted in lieu thereof. The tension of spring 32 determines the number of G's at which the surge lock will lock and this can be set as desired for any particular installation.

What is claimed is:

1. A control line regulator comprising a regulator shaft, a pair of oppositely disposed regulator sheave sectors turnable on said shaft and adapted to receive control cables, rig load regulator spring means carried by said regulator shaft, force transmitting means connecting said spring means and said sheave sectors for urging the latter to turn in opposite directions to maintain the cables under rig tension, said force transmitting means including gripping means to effect the braking of said sheave sectors against relative turning movement when a control load is applied to one of the cables connected to one of said sheave sectors, and additional gripping means comprising an inertia member interconnected between said sheave sectors and operable in response to relative turning of said sheave sectors exceeding a predetermined acceleration to restrain said sectors against further relative movement.

2. A control line regulator as defined in claim 1 wherein said additional gripping means comprises a rotor casing carried by one of said sheave sectors and having a rotor driven by relative movement of said sheave sectors, and a thrust plate carried by said rotor and said inertia member interposed between said rotor and said thrust plate acting in case of excessive relative acceleration of said sheave sectors to force said thrust plate into gripping relation to said rotor casing to thereby restrain the regulator sectors against further relative turning.

3. A control line regulator comprising a supporting shaft, a tubular body carried by said shaft and extending transversely thereof, a lock shaft supported within said body, a locking crosshead slidable along said lock shaft, a central compensating spring within said body bearing against said crosshead, spring guide tubes supported from said body and extending parallel thereto though spaced therefrom, said body and guide tubes having slots accommodating movement of said crosshead, additional compensating springs carried by said spring guide tubes and also bearing against said crosshead, regulator sectors turnable on said shaft and adapted to receive control cables, and links connecting said respective regulator sectors to the respective ends of said crosshead, whereby the force of said central and additional compensating springs act to urge said sectors in opposite directions to maintain the cables under rig tension, said crosshead sliding readily along said lock shaft during normal compensating movements of said sectors but binding upon said lock shaft upon the application of a control force to the control cables due to inequal application of forces by said additional compensating springs to said crosshead, thereby locking said sectors against relative turning.

4. A control line regulator as defined in claim 3 wherein additional locking means is interposed between said regulator sectors to lock the same against relative turning in event one of the control cables should break.

5. A control line regulator as defined in claim 4 wherein said additional locking means comprises a rotor casing having a rotor therein interposed between said sectors, driving means responsive to relative turning of said sectors for turning said rotor, a thrust plate mounted for rotary and linear movement on said rotor, said rotor and thrust plate having opposed complementary sockets, and inertia balls mounted in said sockets, relative turning movement of said sectors in excess of a predetermined acceleration causing said inertia balls to bind said thrust plate against said rotor casing to lock said sectors against relative turning movement.

References Cited by the Examiner

UNITED STATES PATENTS 2,841,031   6/1958   Wrighton  ---------- 74—501.5
2,934,971   5/1960   Phelan  ------------ 74—501.5

MILTON KAUFMAN, *Primary Examiner.*